United States Patent
Turner, Jr.

[15] 3,706,968

[45] Dec. 19, 1972

[54] BEACON PROVIDING VISUAL DIRECTION INFORMATION

[72] Inventor: Charles J. Turner, Jr., Atlanta, Ga.

[73] Assignee: Lockheed Aircraft Corporation, Burbank, Calif.

[22] Filed: Nov. 20, 1970

[21] Appl. No.: 91,260

[52] U.S. Cl. .................. 340/25, 340/366 F, 240/1.2, 240/7.7
[51] Int. Cl. .............................................. G08g 5/00
[58] Field of Search ............... 340/25, 26, 27, 366 F; 240/1.2, 49, 7.7; 350/315, 316

[56] References Cited

UNITED STATES PATENTS

| 3,436,729 | 4/1969 | Zurcher | 340/25 |
| 2,365,038 | 12/1944 | Adler, Jr. | 340/25 |
| 2,096,755 | 10/1937 | Parsberg | 340/25 |
| 3,012,224 | 12/1961 | Ferguson | 240/1.2 |

Primary Examiner—John W. Caldwell
Assistant Examiner—Robert J. Mooney
Attorney—Roger T. Frost and George C. Sullivan

[57] ABSTRACT

An anti-collision beacon for aircraft or other applications. A pair of coaxially displaced filters are sequentially illuminated to provide flashes of light which uniquely identify the quadrants of the filter relative to the position of an observer. The time at which a particular color flash occurs, in relation to the preceding and succeeding contrasting color flashes, varies proportionately to the viewing angle within each quadrant. Another embodiment of this filter provides visual aircraft landing glide-slope information.

14 Claims, 4 Drawing Figures

PATENTED DEC 19 1972  3,706,968
SHEET 1 OF 2
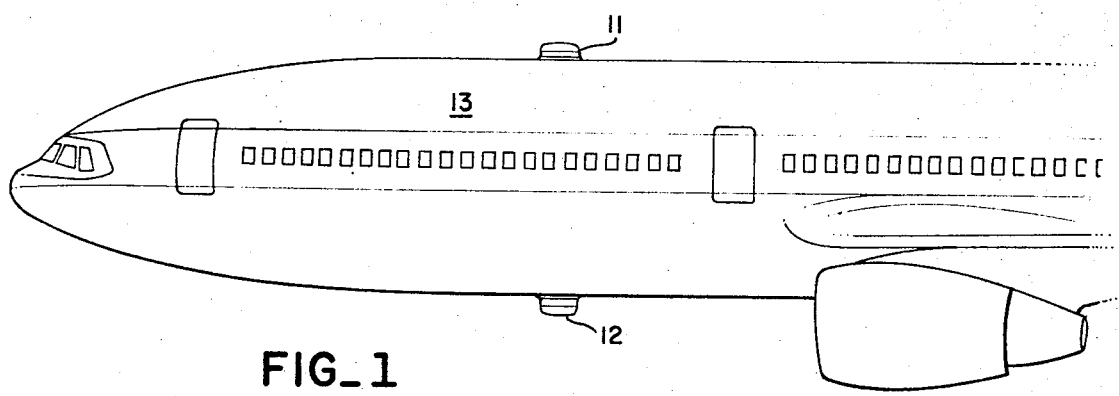
FIG_1
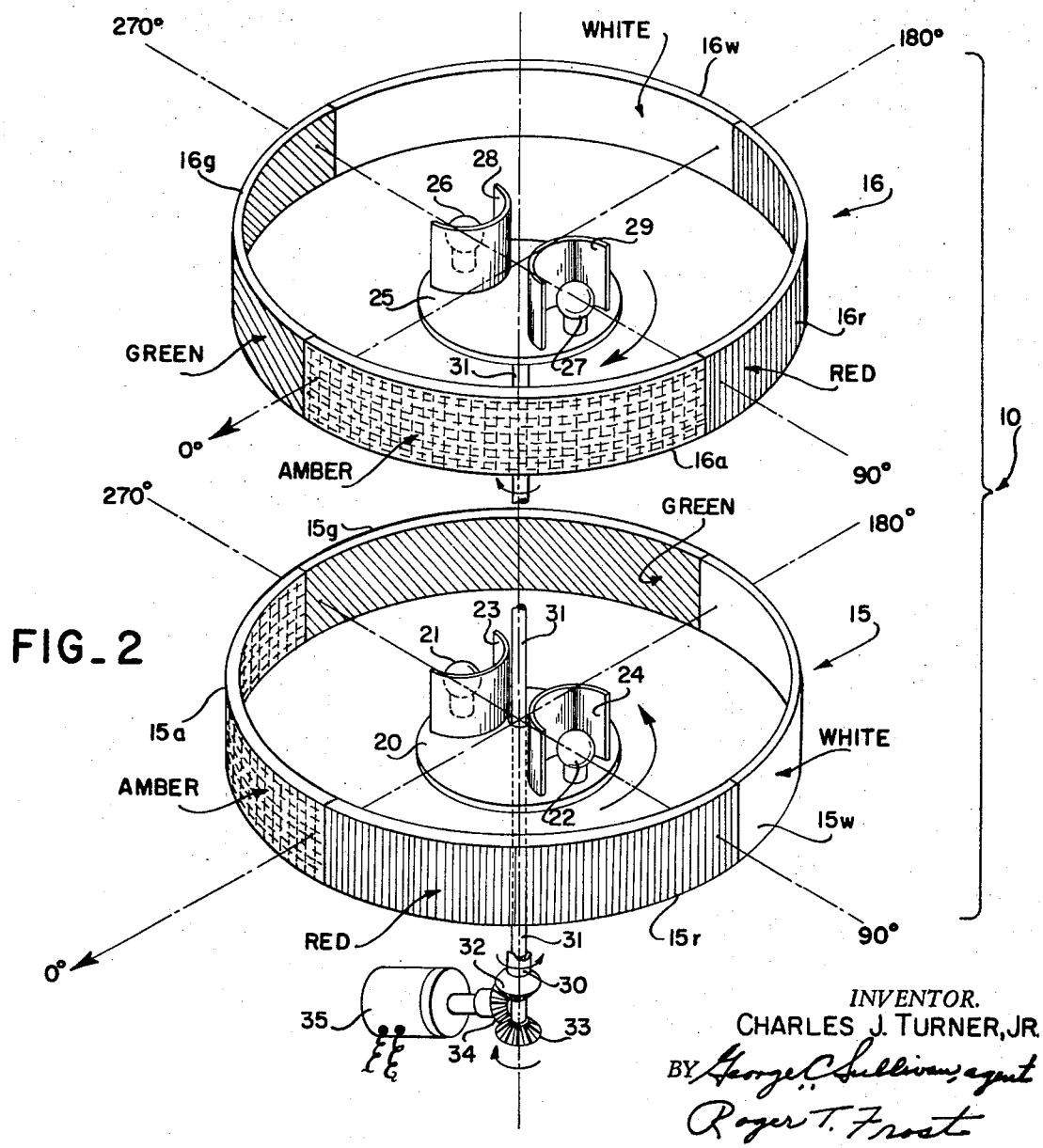
FIG_2
INVENTOR.
CHARLES J. TURNER, JR.
BY George C. Sullivan, agent
Roger T. Frost
Attorney

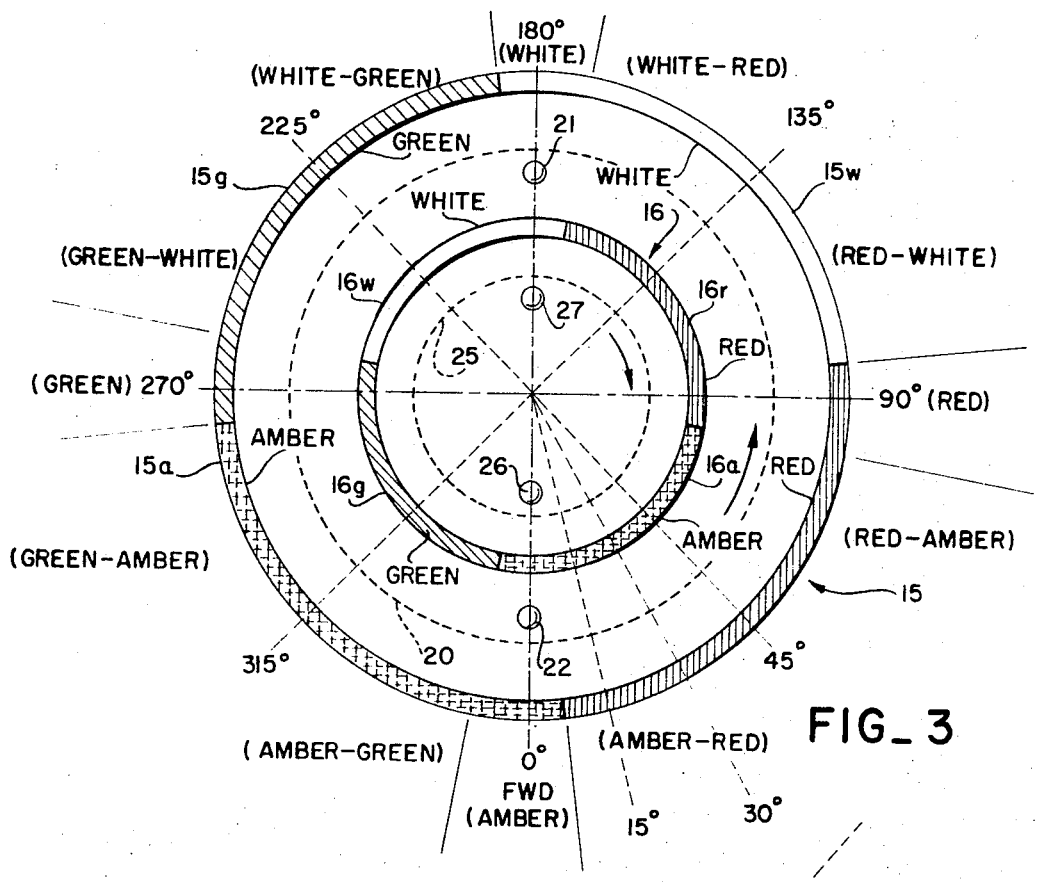
FIG_3
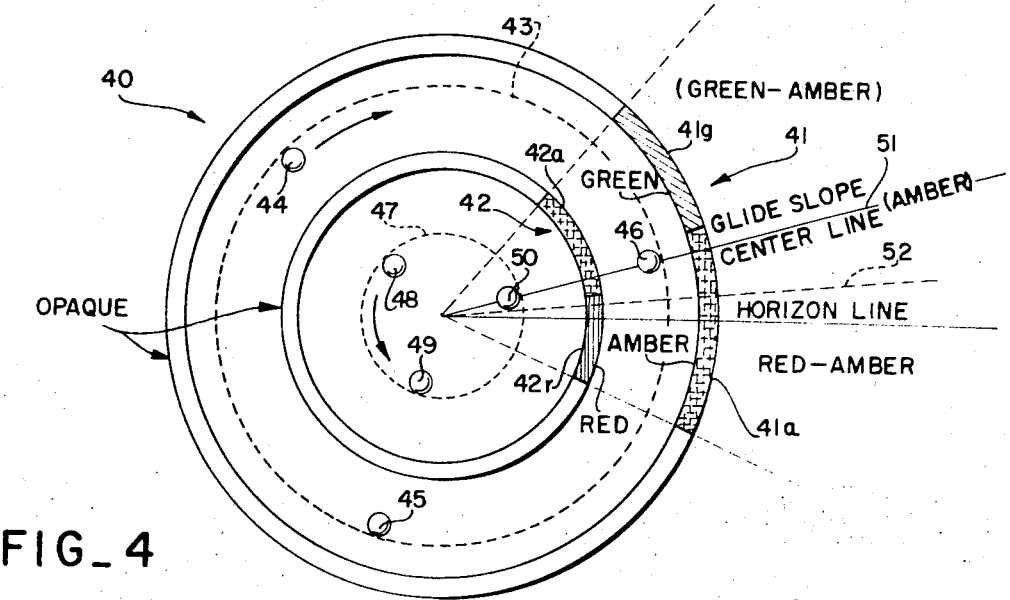
FIG_4
INVENTOR.
CHARLES J. TURNER, JR
BY George C. Sullivan, agent
Roger T. Frost
Attorney

BEACON PROVIDING VISUAL DIRECTION INFORMATION

This invention relates in general to visual beacons and in particular to an anti-collision beacon of the type mounted on vehicles such as aircraft or the like.

The problem of avoiding a mid-air collision between two aircraft is growing apace with the increased traffic in flights by general, commercial, and military aircraft. It is important for the aircraft pilot that he be able to see other aircraft in his vicinity so that he can determine whether the attitude and course of these aircraft require that he take evasive action to avoid an in-flight collision. The rotating red beacon now used on aircraft provides a bright red flashing light to alert the pilot to the presence of the aircraft, but these beacons are omnidirectional, i.e., a person observing the beacon cannot determine the heading of the other aircraft merely by observing the beacon flash. Accordingly, the pilot must observe the displacement of each beacon flash relative to the preceding beacon flashes to determine which way the aircraft is moving before he can decide whether he should take evasive action, and the difficulty of such observation is compounded by the relative velocities of the two aircraft.

Various electronic collision avoidance systems have been proposed which, if used, would provide the pilot with an instrument panel indication of a potential collision situation or of the proper action to be taken to avoid another aircraft. To be effective, however, systems of this kind require that all aircraft flying in a given area must be equipped with elaborate and expensive timing and transponder equipment which is beyond the financial means of most general aviation operators. In the alternative, at least one prior art visual beacon has been proposed which flashes a different color for each quadrant but which provides no information about the aircraft orientation within a particular quadrant and which, therefore, cannot inform an observer of changes in the attitude of the aircraft until the position of the aircraft has moved to a different quadrant, as viewed by the observer.

Accordingly, an object of the present invention is to provide an improved visual beacon.

It is another object of this invention to provide a visual beacon which presents a precise and unambiguous indication of angular position relative to an observer of the beacon.

Still another object of this invention is to provide a visual beacon for installation on an aircraft to produce flashes of illumination providing an observer of such aircraft with an unambiguous indication of the heading of the aircraft.

Yet another object of the present invention is to provide an improved optical aircraft landing approach guidance apparatus.

Still another object of this invention is to provide an optical glideslope apparatus which provides a pilot with an optical indication of the direction and the extent of any deviation from a desired glideslope.

Other objects and many of the attendant advantages of the present invention will become apparent from examining the following description and drawings in which:

FIG. 1 shows a portion of an aircraft fuselage equipped with beacons according to an embodiment of the present invention;

FIG. 2 shows an exploded isometric schematic view of one of the beacons of FIG. 1;

FIG. 3 shows a modified plan view of the FIG. 2 beacon with one of the annular filter members depicted as being reduced in diameter to aid in illustrating the construction and operation of the beacon; and FIG. 4 shows an elevation view of another embodiment of the present invention as used to define an optical glideslope for aircraft landing purposes.

Stated generally, the beacon of the present invention comprises a pair of color filters which are axially displaced from each other. A separate rotating or otherwise movable illumination source is provided within each of the filters, and the filters are divided into segments of distinctive colors which are oriented with respect to each other so that the color and timing of the flashes produced by the filters of the beacon are uniquely dependent upon the azimuthal position of an observer relative to the beacon.

Turning now to FIG. 2, a specific embodiment of a beacon according to the present invention is shown in exploded view generally at 10, it being understood by those skilled in the art that each such beacon in actual construction would be packaged in a streamlined envelope suitable for mounting, as shown at 11 and 12 on the exterior of an aircraft 13 shown in FIG. 1. Each beacon 10 includes a lower segmented filter 15 and an upper segmented filter 16, with the upper segmented filter 16 being positioned above and coaxial with the lower segmented filter 15. Each of the segmented filters in the depicted embodiment preferably is shaped like an annular ring to appear somewhat like a hoop, and the filters 15 and 16 preferably are of equal diameter, although the filter 16 is deliberately depicted in FIG. 3 as being smaller in diameter than the filter 15 to aid in describing the color arrangement of the two filters.

Each of the segmented filters 15 and 16 is divided into four filter segments $15a$, $15r$, $15w$, $15g$ and $16a$, $16r$, $16w$, and $16g$, respectively corresponding to the selected filter segment colors amber, red, white, and green. These particular colors were chosen because aircraft pilots are accustomed to the convention of a green light representing the right side of the aircraft and a red light representing the left side of the aircraft, although other colors could be selected as desired. Although each of the filter segments occupies 90°, or one quadrant of the respective segmented filter, it is apparent in FIG. 3 that the juncture between adjacent filter segments does not coincide with the depicted azimuth lines, with 0° representing the nose of the aircraft and 180° representing the tail of the aircraft on which the beacon is to be mounted. For example, the amber filter segment $15a$ adjoins the red filter segment $15r$ at a point approximately 8° removed from the 0° or heading direction, while the green segment $16g$ of the upper filter adjoins the amber segment $16a$ at an azimuth location of about 252°, or 8° in the negative direction from the 0° line. The purpose and the function of this filter segment angular offset is explained below.

A lower lamp platform 20 is mounted for rotation within the lower segmented filter 15. The lower lamp platform 20 carries a pair of electric lamps 21 and 22 mounted 180° apart on the platform, with each of the lamps having corresponding reflectors 23 and 24. An upper lamp platform 25 is mounted for rotation within the upper segmented filter 16, with the upper lamp platform 25 containing a pair of diametrically opposed lamps 26 and 27, along with corresponding reflectors 28 and 29. The lamp platforms 20 and 25 are driven for rotation in opposite directions by any suitable mechanism, such as an outer shaft 30 connected to drive the lower lamp platform and a concentric inner shaft 31 connected to drive the upper lamp platform. The drive shafts 30 and 31 are respectively connected to gears 32 and 33 counter-rotatably driven by the drive gear 34 and the motor 35. Electricity is supplied to the lamps on each of the lamp platforms through suitable mechanisms of the type known to those skilled in the art, such as slip rings or the like. The lamps and reflectors are aligned so that the path through which the beams of illumination from the lamps 21 and 22 move is substantially spatially coextensive with the path through which the beams from the lamps 26 and 27 move.

The operation of the beacon embodiment depicted in FIGS. 2 and 3 is now described. If the lamp platforms 20 and 25 are initially aligned so that the lamps 21, 22 and 26, 27 are initially aligned along the fore-aft axis of the aircraft on which the beacon is installed, then the lamps will also be aligned at each 90° of displacement from the initial position upon counter-rotation of the lamp platforms. FIG. 2, for example, shows the relative positions of the lamps when the lamp platforms have been rotated 90° from the position shown in FIG. 3. An observer positioned at 0° azimuth with respect to the aircraft, i.e., dead ahead of the aircraft, sees two concurrent amber flashes produced by the light from the lamp 22 passing through the lower amber filter segment 15a and the light from the lamp 26 passing through the upper amber filter segment 16a as these lamps simultaneously sweep past the overlapped portions of the respective amber filter segments. This same observer will see another set of concurrent amber flashes when each of the lamp platforms has rotated 180° to sweep the lamps 21 and 27, respectively, simultaneously across the amber filter segments 15a and 16a. The observer thus knows by observing the concurrent amber flashes from the beacon 10 that the aircraft is on a collision heading with him unless there is enough altitude separation to permit the aircraft to pass safely above or below him.

Assume next that the observer is at 15° of azimuth displaced from the heading of the aircraft. The lamp 26 crosses the 15° line in a clockwise direction just slightly before the lamp 22, moving in the opposite direction, crosses the 15° line. Accordingly, the observer stationed on the 15° line sees an amber flash from the upper filter segment 16a just slightly before seeing a red flash from the lower filter segment 15r, and the amber-just-before-red flash sequence advises the observer that he is just to the left of the aircraft's heading.

If the observer now moves to the 30° azimuth line, for example, it can be seen that the period between the time that the lamp 26 crosses the 30° line and the time that the lamp 22 crosses the same line is greater than the corresponding period for the 15° line. Therefore, the period of time between the amber and the red flashes also increases, informing the observer of his present azimuth position relative to the aircraft. When the observer reaches the 45° line, as shown in FIG. 3, the elapsed time between the passage of any of the lamps across the 45° line and the passage of the next lamp across that line is equal, and so an observer at the 45° line sees consecutive amber and red flashes with an equal time period between each such flash.

If the observer next moves to the 90° line, where he is positioned off the left wing of the aircraft, he will see concurrent red flashes as the lamps 22 and 27 (or 21 and 26) cross the 90° line at the same time to illuminate the overlapped portions of the red filter segments 15r and 16r. In a similar manner, an observer stationed at 180° azimuth, or dead astern of the aircraft, sees concurrent white flashes; and an observer stationed at 270° azimuth, or off the right wing of the aircraft, sees concurrent green flashes. Observation positions at intermediate locations in the quadrants will produce variably timed sequences of the colors observed at the four 90° locations, such color sequences being noted parenthetically in FIG. 3. It is apparent that a unique and unambiguous sequence of color flashes is produced for any azimuth position of the beacon embodied in FIGS. 2 and 3, and an observer who has learned the meaning of the various color flash sequences is immediately aware of his position relative to an aircraft-mounted beacon producing, for example, a green-amber flash sequence.

Another embodiment of the present invention, as shown in FIG. 4, can be used to provide a visual glideslope beacon to aid a pilot in attaining the proper glide angle for landing his aircraft. The beacon embodiment schematically shown in elevation view generally at 40 includes a first segmented filter 41 and a second segmented filter 42. The segmented filters 41 and 42 are coaxially displaced from each other and preferably are of equal diameter comparable to the segmented filters 15 and 16 of the prior embodiment, although the second segmented filter 42 is drawn in FIG. 4 with reduced diameter to facilitate understanding of the operation of the depicted embodiment. A first rotating lamp platform 43 is positioned within the segmented filter 41 and carries three lamps 44, 45, and 46, along with suitable reflectors (not shown), positioned at intervals 120° apart. A second lamp platform 47 is positioned for rotation within the second segmented filter 42 with three lamps 48, 49, and 50, also provided with suitable reflectors, positioned at intervals 120° apart on the second lamp platform. All of the first segmented filter 41 is opaque except for a green filter segment 41g and an amber filter segment 41a, and all of the second segmented filter 42 is opaque except for an amber filter segment 42a and a red filter segment 42r. Since amber is the color selected in this embodiment to inform the pilot that he is flying the proper glide path, the two amber filter segments 41a and 42a are dimensioned to overlap the glideslope centerline 51 as shown. Each of the lamp platforms 43 and 47 is rotated in opposite directions by a suitable mechanism such as shown in FIG. 2, and electricity is supplied to the lamps on the rotating lamp platforms by a suitable mechanism.

Assuming that a pilot is flying his aircraft along the glideslope centerline 51, he sees only concurrent amber flashes because each lamp on the first lamp platform 43 crosses the centerline 51 at the same time that a corresponding lamp on the second lamp platform 47 crosses that centerline. If the pilot drops below the desired glideslope centerline 51 to be flying along a line such as 52, the lamp 50 crosses the line 52 and produces a red flash through the filter segment 42r just before the lamp 46 crosses the line 52 to produce an amber flash through the filter segment 41a. The pilot thus is advised by the red-immediately followed-by-amber flash sequence that he has dropped just below the lower limit of the desired glideslope range. In a similar manner, if the pilot is flying along a line of flight which passes through the green filter segment 41g, he will perceive a green-amber flash sequence which advises him that he is flying above the desired glide path. As the extent of departure from the desired glideslope increases in either direction, the green-amber or red-amber timing ratio changes so that the pilot is also advised of the extent of the flight path departure.

It will be apparent that the glideslope beacon of FIG. 4 can be modified to provide localizer information simply by rotating the beacon 90° around the centerline 51. It also follows that a pair of the FIG. 4 beacons can be used together to provide both glideslope and localizer information, in which case distinctive and separate colors should be used in the two beacons.

The use of three lamps on each of the platforms in the FIG. 4 embodiment provides a greater change in flash rate for a given angular displacement from the glideslope centerline than would be provided through the use of two lamps per platform. A deviation of plus or minus 30° from the centerline 51 thus produces an equal-duration green-amber or red-amber color flash, respectively, whereas a deviation of 45° is required to produce a flash sequence of equal duration when each platform contains only two lamps. The embodiment of FIG. 4 could be provided with fewer or more lamps per platform, depending upon the desired amount of change in the flash rate for a given amount of displacement from the centerline.

Other physical construction configurations can be used to produce the results described herein. For example, the hoop-shaped filters could be replaced by disc-shaped filters aligned with appropriate light sources. If such disc-shaped filters were not perpendicular to the plane through which the beacon flashes must sweep, prisms or other suitable optical devices could be used to change the direction of the light beams passing through the filters.

The amount of overlap or offset between filter segments of the same color, shown herein as 16°, can be varied to produce the desired visual flash. The beam width of the lamp-reflector combination, as well as the angular velocity of the lamp platforms, are factors to be considered in selecting the amount of filter segment overlap.

If it is necessary to use two beacons on an aircraft, as shown in FIG. 1, the rotations of the two beacons should be synchronized so that an observer positioned to view both beacons will see the same flash sequence from each beacon at the same time.

Although the present invention is depicted herein with counter-rotating lamp platforms, similar results are obtainable by using platforms rotating in the same direction. In this case, the number of lamps on each of the two platforms is unequal and the ratio of angular velocity of the two platforms is inversely proportional to the ratio of the number of lamps on the platforms.

It should be understood, of course, that the foregoing relates only to preferred embodiments of the invention and that numerous modifications or alterations may be made therein without departing from the spirit and the scope of the invention, as set forth in the appended claims.

What is claimed is:

1. An optical beacon for selectively casting flashes of illumination along a field of view, said beacon comprising:

a first illumination means operative to produce a first beam of illumination which periodically traverses a first predetermined path along the field of view;

first color filter means associated with the beacon and traversed by the beam of illumination from said first illumination means to impart color information to said first beam;

a second illumination means operative to produce a second beam of illumination which periodically traverses a second predetermined path along the field of view;

second color filter means associated with the beacon and traversed by the beam of illumination from said second illumination means to impart color information to said second beam;

said first and second illumination means being positioned relative to each other to cause the first predetermined path traversed by the first beam of illumination to be substantially coextensive with the second predetermined path traversed by the second beam of illumination; and each of said first and second color filter means being operative to impart color information to its respective traversing beam of illumination so that at least some of the locations along said coextensive first and second predetermined path are periodically illuminated by a unique time sequence of color flashes from said beams of illumination.

2. An optical beacon for selectively casting flashes of illumination along a field of view, said beacon comprising:

a first support means disposed for rotation on an axis;

at least one illumination means positioned on said first support means to direct a first beam of illumination along a first rotative path in the field of view;

first filter means positioned to be traversed by said first beam of illumination as said first support means is rotated;

said first filter means being divided along the direction of beam movement into a plurality of color filter segments so that the color of the first beam of illumination in the field of view is determined by the color of the filter segment through which the first beam passes;

a second support means disposed for rotation on said axis;

at least one illumination means positioned on said second support means to direct a second beam of illumination along a second rotative path in the field of view;

each of said illumination means being disposed so that said first and second rotative paths of beam movement are substantially spatially coextensive with each other;

second filter means positioned to be traversed by said second beam of illumination as said second support means is rotated;

said second filter means being divided along the direction of beam movement into a plurality of color filter segments so that the color of the second beam of illumination is determined by the color of the filter segment through which the second beam passes; and motive means operatively associated with said first and second platforms to impart rotation to both of said platforms to cause the period of time between the arrival of said first beam at a point in the field of view and the arrival of said second beam at the same point in the field of view to be constant for such point and to be a function of the location of such point in the field of view.

3. Apparatus as in claim 2, wherein said motive means is operative to cause said first and second support means to counter-rotate at equal rotational speed.

4. Apparatus as in claim 3, wherein each of said support means mounts a plurality of said illumination means positioned to direct a corresponding number of beams of illumination spaced equidistant around said axis of rotation.

5. Apparatus as in claim 2, wherein each of said illumination means is operative to direct a plurality of beams of illumination substantially radially of said axis and spaced angularly equidistant around said axis of rotation.

6. Apparatus as in claim 5, wherein said motive means is operative to cause each of said support means to counter-rotate at equal rotational speed, and wherein the number of beams of illumination directed by said first illumination means is equal to the number of beams of illumination directed by said second illumination means.

7. Apparatus as in claim 5, wherein said second illumination means directs a number of beams of illumination which is unequal to the number of beams of illumination directed by said first illumination means, and said motive means is operative to cause each of said support means to rotate in the same direction such that the ratio of the angular velocity of the first support means relative to the angular velocity of the second support means is inversely proportional to the ratio of the number of beams of illumination directed by the first illumination means relative to the number of beams of illumination directed by the second illumination means.

8. Apparatus as in claim 2, wherein:
said first filter means is angularly aligned on said axis with respect to said second filter means so that the division between at least one pair of contiguous filter segments of said first filter means is angularly aligned with a filter segment of said second filter means.

9. Apparatus as in claim 8, wherein one of said contiguous filter segments is the same color as said angularly aligned filter segment of said second filter means.

10. Apparatus as in claim 2, wherein:
said filter segments of said first filter means are disposed to provide a first angular sequence of certain colors to be traversed by said first beam of illumination;
said filter segments of said second filter means are disposed to provide a second angular sequence of certain colors identical to said first angular sequence of colors and to be traversed by said second beam of illumination; and
said second sequence of certain colors being angularly displaced on said axis a predetermined amount with respect to said first sequence of certain colors.

11. Apparatus as in claim 10, wherein said field of view substantially comprises a circle around said axis, and where the respective filter segments of each of said first and second filter means is disposed to provide a circular sequence of said certain colors.

12. Apparatus as in claim 11, wherein the angular extent of all of said filter segments is the same.

13. Apparatus as in claim 12, wherein each of said filter segments is approximately ninety degrees in angular extent, so that each of said filter means includes four filter segments to provide an angular sequence of four colors.

14. Apparatus as in claim 13, wherein:
said motive means is operative to cause each of said support means to counter-rotate at equal rotational speed; and
each of said illumination means is operative to direct a pair of diametrically opposed beams of illumination through the respective filter means.

* * * * *